(12) United States Patent
Deliz Centeno et al.

(10) Patent No.: US 12,132,770 B2
(45) Date of Patent: Oct. 29, 2024

(54) ASYMMETRIC PRESENTATION OF AN ENVIRONMENT

(71) Applicant: Apple Inc., Cupertino, CA (US)

(72) Inventors: Luis R. Deliz Centeno, Oakland, CA (US); Joseph P. Cerra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/189,449

(22) Filed: Mar. 24, 2023

(65) Prior Publication Data

US 2023/0308495 A1 Sep. 28, 2023

Related U.S. Application Data

(63) Continuation of application No. PCT/US2021/049835, filed on Sep. 10, 2021.
(Continued)

(51) Int. Cl.
*H04L 65/403* (2022.01)
*G06F 3/048* (2013.01)
(Continued)

(52) U.S. Cl.
CPC ............ *H04L 65/403* (2013.01); *G06F 3/048* (2013.01); *G06T 7/20* (2013.01); *G06T 11/00* (2013.01);
(Continued)

(58) Field of Classification Search
CPC ......... H04L 65/403; G06F 3/048; G06T 7/20; G06T 11/00; G06T 13/40; G06T 19/006; G06T 2219/024
See application file for complete search history.

(56) References Cited

U.S. PATENT DOCUMENTS

2017/0354875 A1 12/2017 Marks
2018/0005429 A1 1/2018 Osman
(Continued)

FOREIGN PATENT DOCUMENTS

EP 3263194 A1 1/2018
EP 3702008 A1 9/2020
(Continued)

OTHER PUBLICATIONS

Milan Dolezal et al., An Immersive Virtual Environment for Collaborative Geovisualization, Sep. 1, 2017, International Conference on Virtual Worlds and Games for Serious Applications, pp. 272-275 (Year: 2017).*
(Continued)

*Primary Examiner* — Tam T Tran
(74) *Attorney, Agent, or Firm* — Blank Rome LLP

(57) ABSTRACT

The disclosure pertains to techniques for collaborating in a multi user communications environment. One such technique includes receiving, at a first communication device, data associated with a multi user communication session between a first user of the first communication device and a second user of a second communication device, presenting, at the first communication device, a non-extended reality graphical user interface (GUI), the non-extended reality GUI including a non-extended reality representation of a virtual object included in the multi user communication session and a representation of the second user based on the data associated with the multi user communication session, and updating, at the first communication device, the non-extended reality GUI to illustrate an interaction between the representation of the second user and the virtual object in response to the data indicating the interaction.

20 Claims, 10 Drawing Sheets

Related U.S. Application Data

(60) Provisional application No. 63/083,321, filed on Sep. 25, 2020.

(51) Int. Cl.
  *G06T 7/20* (2017.01)
  *G06T 11/00* (2006.01)
  *G06T 13/40* (2011.01)
  *G06T 19/00* (2011.01)

(52) U.S. Cl.
  CPC ............ *G06T 13/40* (2013.01); *G06T 19/006* (2013.01); *G06T 2219/024* (2013.01)

(56) References Cited

U.S. PATENT DOCUMENTS

| | | | |
|---|---|---|---|
| 2018/0243650 A1* | 8/2018 | Baszucki | A63F 13/355 |
| 2018/0311585 A1 | 11/2018 | Osman | |
| 2019/0026958 A1 | 1/2019 | Gausebeck | |
| 2019/0081993 A1* | 3/2019 | Shim | H04L 65/4015 |
| 2019/0362557 A1* | 11/2019 | Lacey | G06T 5/20 |
| 2020/0218074 A1* | 7/2020 | Hoover | G06F 3/013 |
| 2021/0375022 A1* | 12/2021 | Lee | G06T 19/00 |

FOREIGN PATENT DOCUMENTS

| | | |
|---|---|---|
| WO | 2017031389 A1 | 2/2017 |
| WO | 2018224847 A2 | 12/2018 |

OTHER PUBLICATIONS

Martin Bellgardt et al., Utilizing Immersive Virtual Reality in Everyday Work, Mar. 19, 2017, Workshop on Everyday Virtual Reality, pp. 1-4 (Year: 2017).*

* cited by examiner

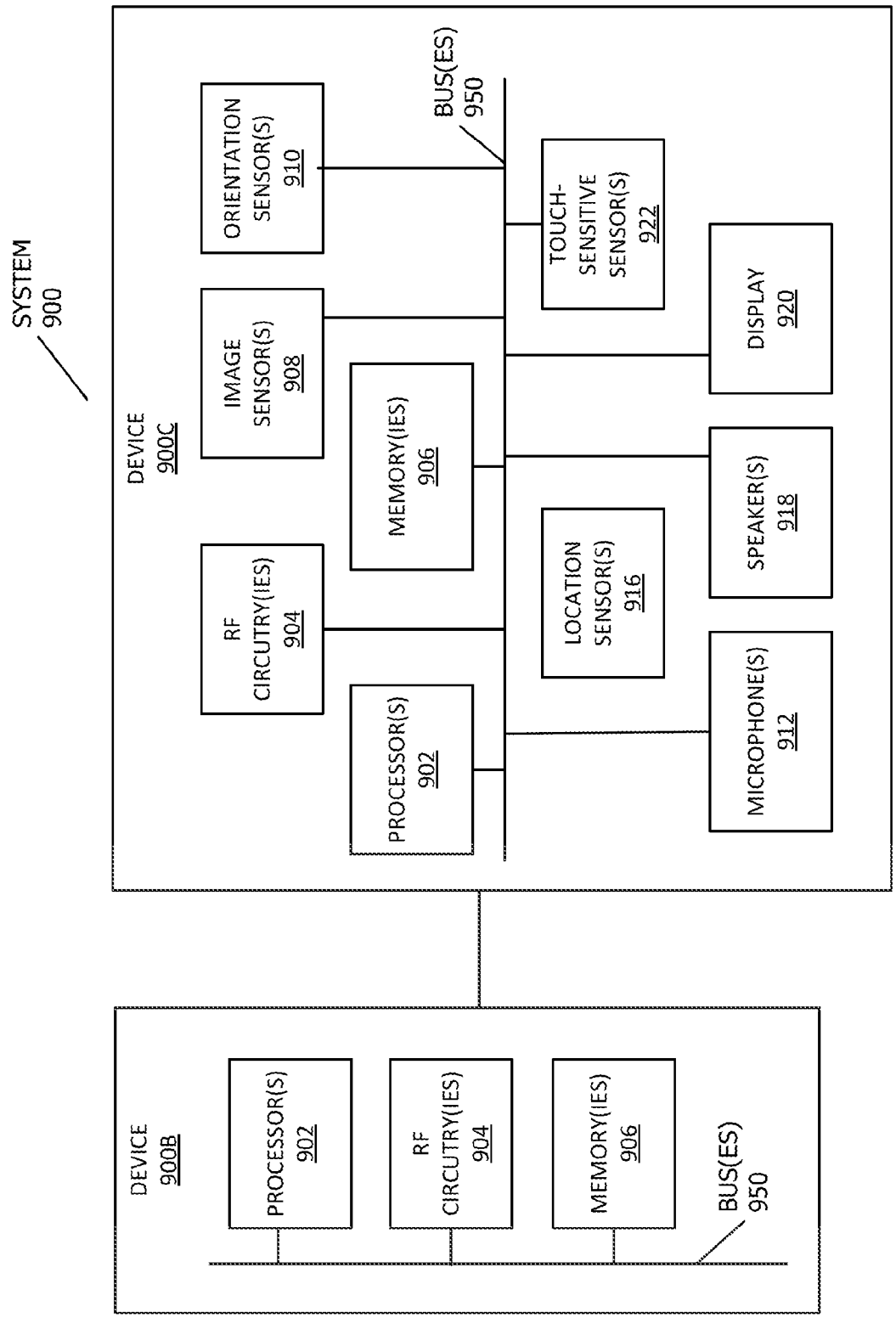

ASYMMETRIC PRESENTATION OF AN ENVIRONMENT

BACKGROUND

This disclosure relates generally to multi user environments. More particularly, but not by way of limitation, this disclosure relates to techniques and systems for automatically determining application state in an extended reality (XR) environment.

Some devices are capable of generating and presenting XR environments (XRE). An XRE may include a wholly or partially simulated environment that people sense and/or interact with via an electronic system. In an XRE, a subset of a person's physical motions, or representations thereof, are tracked, and, in response, one or more characteristics of one or more virtual elements simulated in the XRE are adjusted in a manner that comports with at least one law of physics. Some XREs allow multiple users to interact with each other within the XRE. However, what is needed is an improved technique to determine application states in an XRE.

BRIEF DESCRIPTION OF THE DRAWINGS

FIGS. 9A and 9B show exemplary systems for use in various XR technologies, in accordance with one or more embodiments.

DETAILED DESCRIPTION

Figure 1:
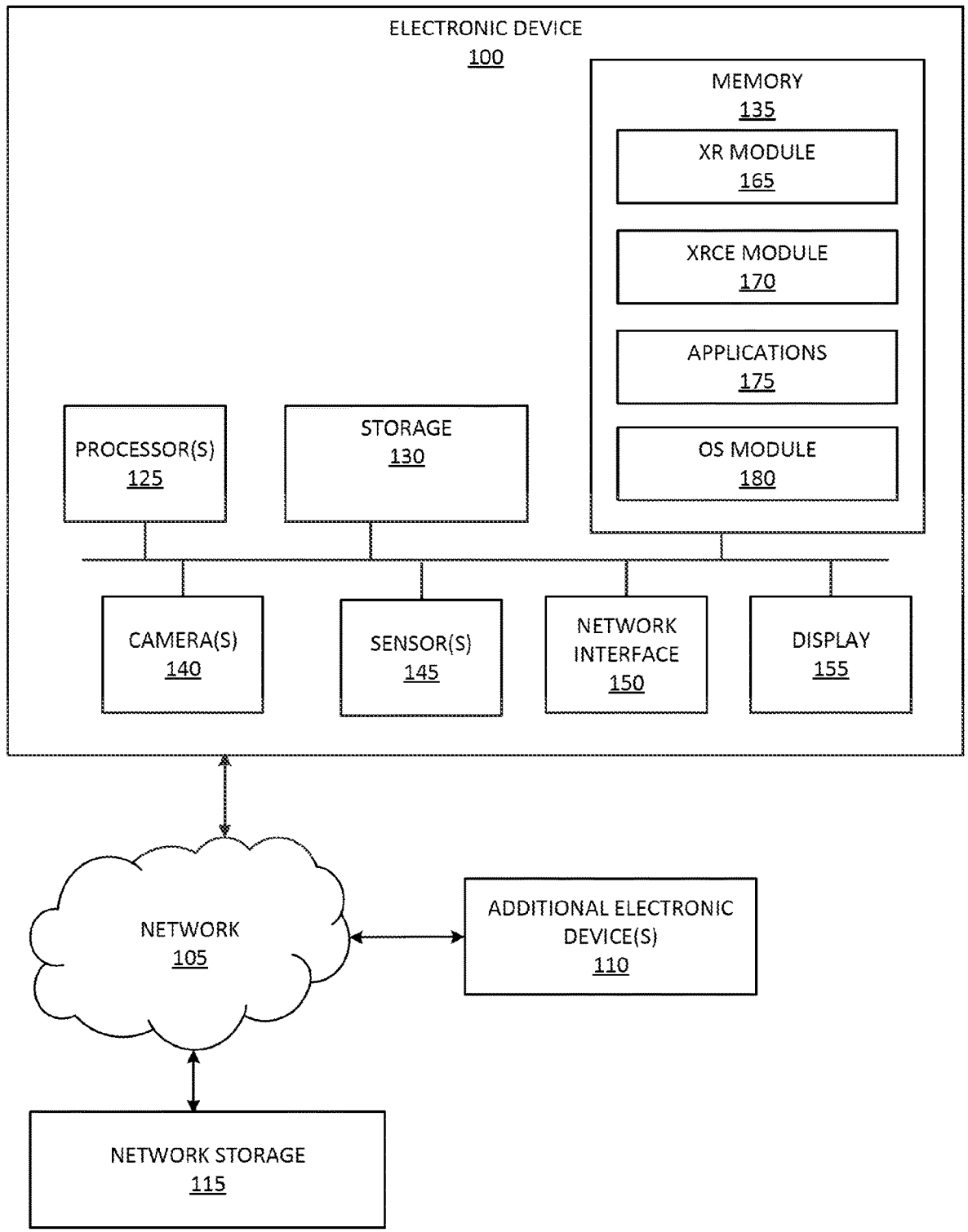
FIG. 1 shows, in block diagram form, a simplified system diagram according to one or more embodiments.

This disclosure pertains to techniques for users collaborating within a XRC session. The XRC session may be accessible by a range of devices with a range of capabilities. For example, certain participating devices may be able to display an XR view of the XRC session. Other device may not be capable of displaying the XR view and may instead render a non-XR view. Generally, users may participate in the XRC session to interact with virtual objects and each other. A non-XR view may include a user interface that displays virtual objects available for interaction to help facilitate user interactions with these virtual objects or other users in the XRC session. Accordingly, techniques described herein provide an improved user interface for interacting in an XRC session.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command)

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface)

For purposes of this disclosure, an XR communication (XRC) session can be represented by an XR environment (XRE) in which two or more devices are participating.

For purposes of this disclosure, a local XRC device refers to a current device being described, or being controlled by a user being described, in a XRC session.

For purposes of this disclosure, colocated XRC devices refer to two devices that share a physical environment and a XRC session, such that the uses of the colocated devices may experience the same physical objects and XR objects.

For purposes of this disclosure, a remote XRC device refers to a secondary device that is located in a separate physical environment from a current, local XRC device. In one or more embodiments, the remote XRC device may be a participant in the XRC session.

For purposes of this disclosure, shared virtual elements refer to XR objects that are visible or otherwise able to be experienced in an XRE by participants in a XRC session.

For purposes of this disclosure, an XRC computing environment (XRCE) refers to a computing environment or container of an XRC session capable of hosting applications. The XRCE enables applications to run within an XRC session. In certain cases, the XRCE may enable users of the XRC session to interaction with hosted applications within the XRC session.

For the purposes of this disclosure, an XRCE instance refers to an XRCE of a current device being described, or being controlled by a user being described. The XRCE instance can allow the user to participate in an XRC session and run an application in the XRC session.

For the purposes of this disclosure, a second XRCE instance refers to an XRCE of a secondary device, or being controlled by a second user, in the XRC session, other than the local XRCE instance. The second XRCE instance may be remote or colocated.

For the purposes of this disclosure, an XRCE application refers to an application which is capable of executing within the context of an XRCE.

For the purposes of this disclosure, a second XRCE application refers to an XRCE application of a secondary device, or being controlled by the second user, in the XRC session, other than the local XRCE instance. The second XRCE application may be remote or colocated.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, and/or resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time consuming, but would nevertheless be a routine undertaking for those of ordinary skill in the design and implementation of graphics modeling systems having the benefit of this disclosure.

Referring to FIG. 1, a simplified block diagram of an XR electronic device 100 is depicted, communicably connected to additional XR electronic devices 110 and a network storage 115 over a network 105, in accordance with one or more embodiments of the disclosure. The XR electronic device differs from other electronic devices by displaying a XRE in such a way as to allow a user of the XR electronic device to perceive the XRE as a three-dimensional (3D), interactive experience. In contrast other electronic devices may be capable of displaying a two dimensional "window" which may display a 3D perspective projection into the XRE. Extended reality electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Extended reality electronic device 100, additional XR electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. According to one or more embodiments, XR electronic device 100 is utilized to participate in an XRC session. It should be understood that the various components and functionality within XR electronic device 100, additional XR electronic device 110 and network storage 115 may be differently distributed across the devices, or may be distributed across additional devices. The XR electronic device 100 may include a network interface 150, which interfaces with networking components, such as radio, infrared, and/or visible light transceivers for communicating with other devices. The network interface 150 may interface with either wired or wireless networking components, or both.

Extended reality electronic device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Extended reality electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer readable storage medium, capable of storing computer readable code. Memory 135 may store various programming modules for execution by processor(s) 125, including XR module 165, a XRCE module 170, and other various applications 175. Extended reality electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may be configured to store content items 160, according to one or more embodiments.

Extended reality electronic device 100 may also include one or more cameras 140 or other sensors 145, such as depth sensor, from which depth of a scene may be determined. In one or more embodiments, each of the one or more cameras 140 may be a traditional RGB camera, or a depth camera. Further, cameras 140 may include a stereo- or other multi-camera system, a time-of-flight camera system, or the like. Extended reality electronic device 100 may also include a display 155. The display device 155 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

According to one or more embodiments, memory 135 may include one or more modules that comprise computer readable code executable by the processor(s) 125 to perform functions. The memory may include, for example, an XR module 165 which may be used to provide an XR environment for a local XRC device. A XRCE module 170 may generate an environment supporting the XR environment. For example, the XRCE module 170 may provide services and/or application programming interfaces that may be used by the XR environment and/or hosted applications to interface with the operating system (OS) and/or hardware of the extended reality electronic device 100. The XRC session may be a computing environment which supports a shared experience by extended reality electronic device 100 as well as additional extended reality electronic devices 110.

The memory 135 may also include an OS module 180, for supporting basic functionality and managing hardware of the XR electronic device 100. The OS module 180 provides an environment in which applications 175 may execute within. The XRCE module 170 and XR module 165 may run within the context of the OS module 180, in certain cases. In other cases, XRCE module 170 and XR module 165 may handle basic functionally and manage hardware of the XR electronic device 100 in parallel with, or in place of, the OS module 180. The XRCE module 170 also provides an environment in which applications 175 may execute within. Applications 175 may include, for example, computer applications that may be experienced in a XRC session by multiple devices, such as XR electronic device 100 and additional XR electronic devices 110.

Although XR electronic device 100 is depicted as comprising the numerous components described above, in one or more embodiments, the various components may be distributed across multiple devices. Accordingly, although certain calls and transmissions are described herein, with respect to the particular systems as depicted in one or more embodiments, the various calls and transmissions may be made differently directed based on the differently distributed functionality. Further, additional components may be used, some combination of the functionality of any of the components may be combined.

Figure 2:
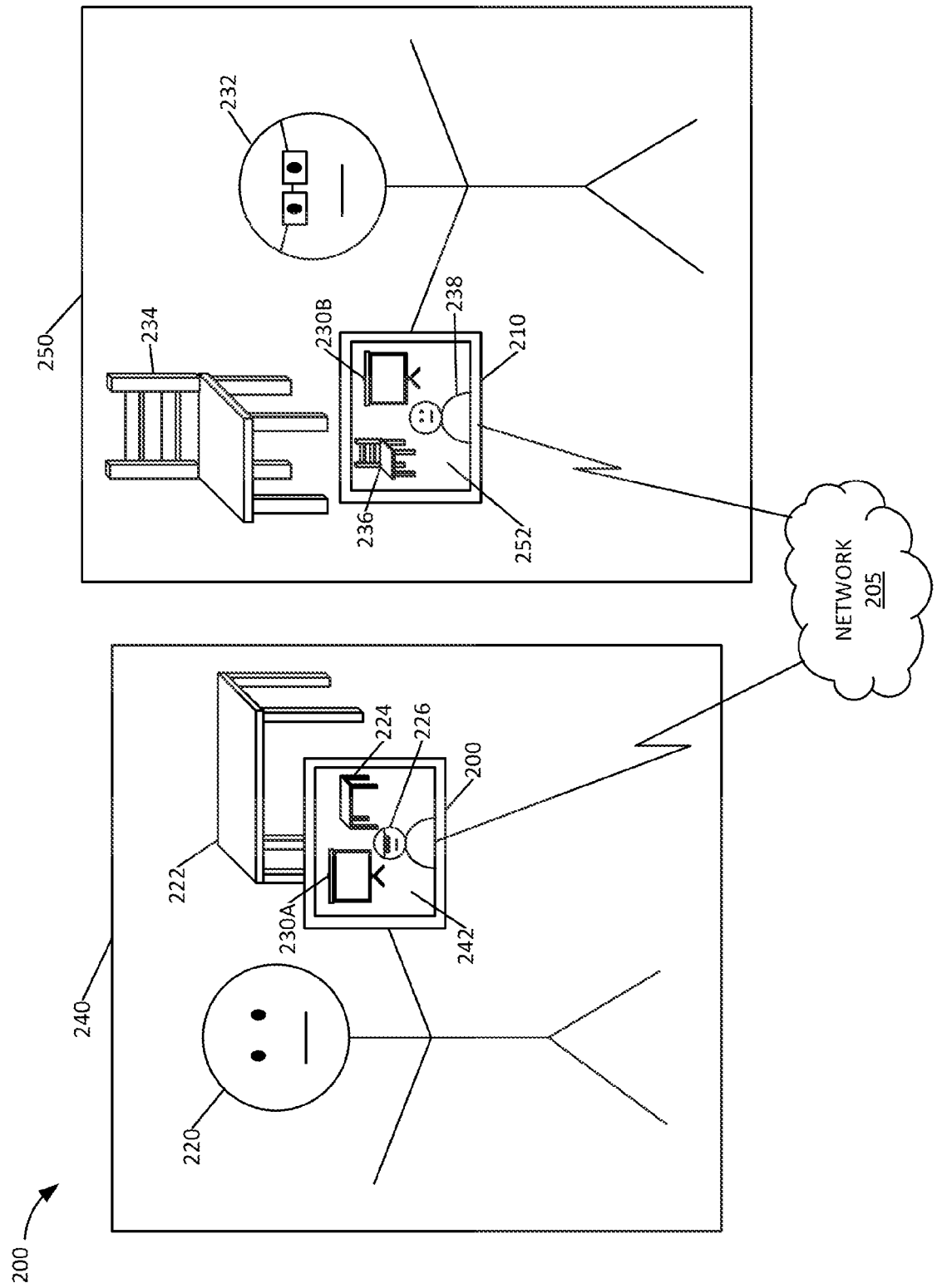
FIG. 2 shows a diagram of example operating environments, according to one or more embodiments.

FIG. 2 shows a diagram of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 2, the first environment 240 includes a first user 220 that is utilizing a first electronic device 200, and the second environment 250 includes a second user 232 that is utilizing a second electronic device 210. In one or more embodiments, the first electronic device 200 and the second electronic device 210 include mobile devices, such as handheld devices, wearable devices, and the like.

In one or more embodiments, the first electronic device 200 and the second electronic device 210 communicate with each other via a network 205. Examples of network 205 may include, for example, the Internet, a wide area network (WAN), a local area network (LAN), etc. In one or more embodiments, the first electronic device 200 and the second electronic device 210 may be participating in a XRC session.

Although electronic device 200 and electronic device 210 may be participating in the common XRC session, the virtual environment may be rendered differently on each device. As shown, the electronic device 200 may depict physical objects of the environment 240. As shown, physical table 222 may be depicted on the display 242 as a virtual table 224. In one or more embodiments, the display 242 may be a pass-through display, and virtual table 224 may simply be a view of physical table 222 through display 242.

Display 242 of electronic device 200 may also include an avatar 226 corresponding to user 232 in physical environment 250. For purposes of this disclosure, and avatar may include a virtual representation of a user. The avatar may depict real-time actions of the corresponding user 232, including movement, updated location, and/or interactions with various physical components and/or virtual components within the XRC session.

According to one or more embodiments, an XRCE may be an XRE that supports one or more XRCE applications or other modules which provide depictions of XR objects across all participating devices, such as electronic device 200 and electronic device 210. As shown in display 242, presentation panel 230A is an example of a virtual object which may be visible to all participating devices.

As an example, returning to environment 250, electronic device 210 includes a display 252, on which the presentation panel virtual object 23013 is depicted. It should be understood that in one or more embodiments, although the same virtual object may be visible across all participating devices, the virtual object may be rendered differently according to the location of the electronic device, the orientation of the electronic device, or other physical or virtual characteristics associated with electronic devices 200 and 210 and/or the XRCE depicted within displays 242 and 252.

Returning to environment 250, another characteristic of an XRC session is that while virtual objects may be shared across participating devices, physical worlds may appear different. As such, physical chair 234 is depicted as virtual chair 236. As described above, and in one or more embodiments, display 252 may be a pass-through display, and virtual chair 236 may be a view of physical chair 234 through the pass-through display 252. In addition, electronic device 210 depicts an avatar 238 corresponding to user 220 within physical environment 240.

According to one or more embodiments, the virtual objects, such as presentation panel 230, may be rendered in conjunction with an XRCE application. In one or more embodiments, multiple XRCE applications may be executed within an XRCE. For example, the XRCE can host XRCE applications within the virtual environment of the XRCE as virtual objects. An application may be configured to be run either within or outside of an XRCE. For example, an application may include multiple operating modes based on an operating environment, or context, in which the application is executing, for example, an XRCE mode, and a non-XRCE mode. It may be determined that the application is running within the context of the XRCE, such as through an application programming interface (API) and operate in the XRCE mode. The application, when run outside of the XRCE, may run in the non-XCRE mode. As used herein, the XRCE application, or hosted application, may also refer to an application running in XRCE mode, as well as an application that is solely configured to run within the context of an XRCE. The XRCE may provide a container or computing environment in which an XRCE application may run, in a manner similar to an operating system. These containers may be presented to the user as virtual objects, such that the XRCE application appears to be executing in a window, on a surface, or another virtual object.

In certain cases, the XRCE applications are executed in the context of a specific XRCE instance. For example, a first user, associated with a first device, may be participating in a XRC session with a second user, associated with a second device. The XRCE application in this example executes on both the first and second device. Based on input from the first user, the first device may execute a first XRCE application hosted in a local XRCE instance. The first XRCE application may share data with a second XRCE application, hosted in a second XRCE instance, executing on a second device. Executing a hosted application within a context of a specific XRCE instance helps provide a measure of privacy for the local user within the XRCE. In certain cases, XRCE instances may be executed in local devices. In other cases, XRCE instances may execute, at least in part, on a network or hosted device.

In certain cases, users of the XRCE may share content from XRCE applications with other users. Examples of content include images, video, audio, documents, spreadsheets, presentations and the like. According to one or more embodiments, the one or more XRCE applications executing within the XRCE may share content between the participants of the XRC session. For example, a first user may use an XRCE application to share their content, such as photos, videos, music, etc., with other users active in the XRC session, such as a second device.

Figure 3:
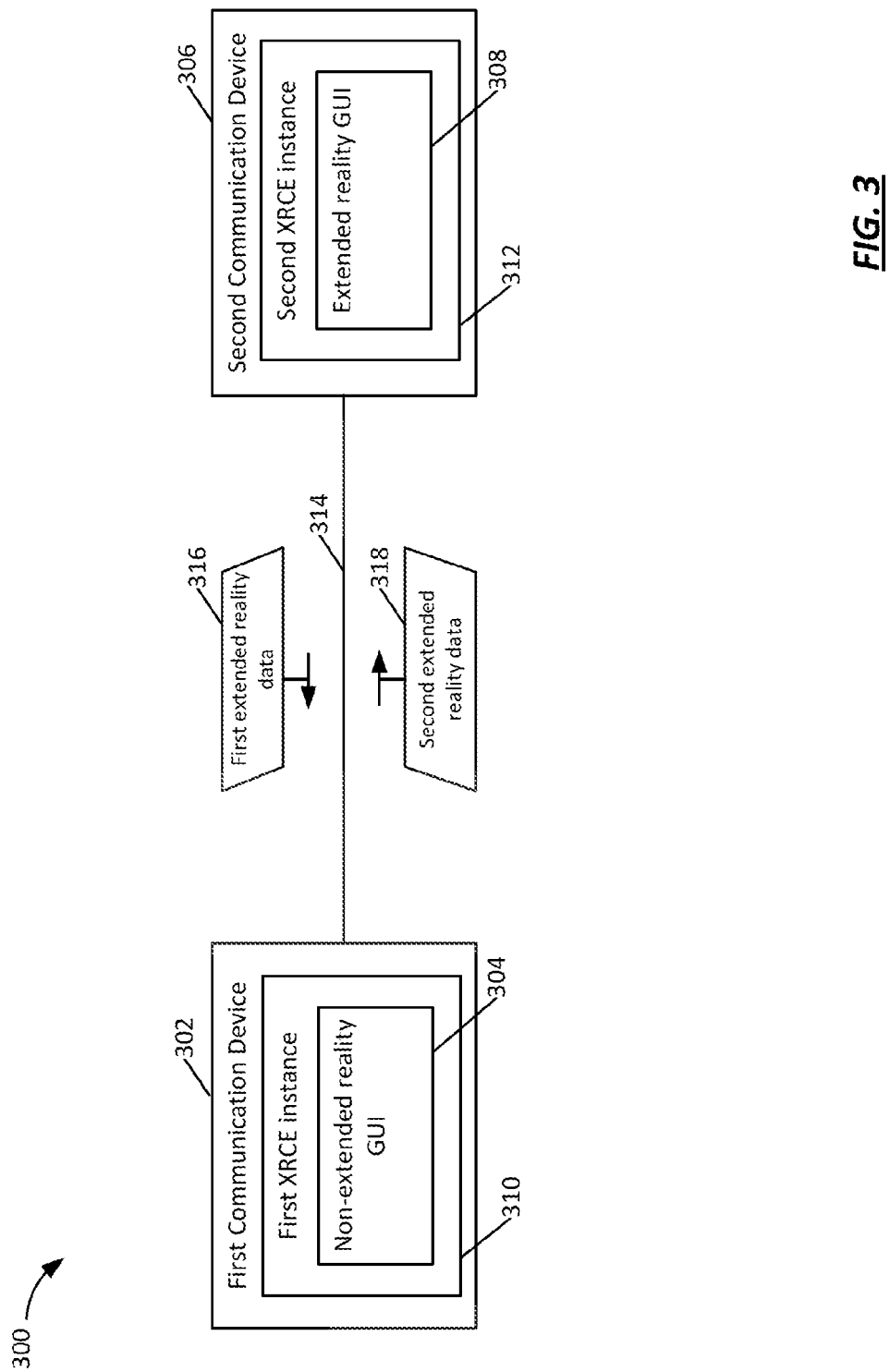
FIG. 3 is a block diagram illustrating an example communications environment, in accordance with aspects of the present disclosure.

FIG. 3 is a block diagram illustrating an example communications environment 300, in accordance with aspects of the present disclosure. Users may access an XRC session using a variety of devices with a variety of capabilities to access the XRC session. As an example, a first user may access the XRC session using a first communication device 302. The first communication device 302, such as a personal computing device like a laptop computer, may be capable of accessing the XRC session using a non-XR graphical user interface (GUI) 304. A second user may access the XRC session using a second communication device 306. The second communication device 306, such as head-mounted device, may be capable of accessing the XRC session using an XR GUI 308. Other users may also access the XRC session with a variety of devices, such as a smartphone, tablet, smartwatch, etc. In certain cases, the non-XR GUI 304 and XR GUI 308 may be a part of an XRCE. For example, the non-XR GUI 304 may execute within the context of a first XRCE instance 310 executing on the first communication device 302 and the XR GUI may execute within the context of a second XRCE instance 312 on the second communication device 306. In certain cases, the XRCE instances provide services and/or access to interfaces that may be used for the XRC session. For example, an XRCE instance may provide data transfer, networking, audio, video, avatar handling functionality, etc. As a more specific example, the XRCE instances may provide a data stream 314 for carrying XR data, such as first XR data 316 and second XR data 318 between the first communication device 302 and the second communication device 306. It may be understood that while shown as a direct connection between the first communication device 302 and the second communication device 306, the data stream may be routed via any number of intermediaries, such as routers, hubs, switches, gateways, as well as servers which may process and/or coordinate the data stream.

In certain cases, the data stream, as between devices participating in the XRC session, may be of a common format as between devices, such that the same information may be available to each device, assuming an appropriate network bandwidth is available. For example, the data stream may include a scene graph, which includes information describing the shared virtual elements of the XRC session, such as avatars, virtual objects, spatial arrangement information, etc. This data stream may be common to devices capable of presenting the XRC session. While the data stream may be common, how various devices display the shared virtual elements of the XRC session may vary.

Figure 4B:
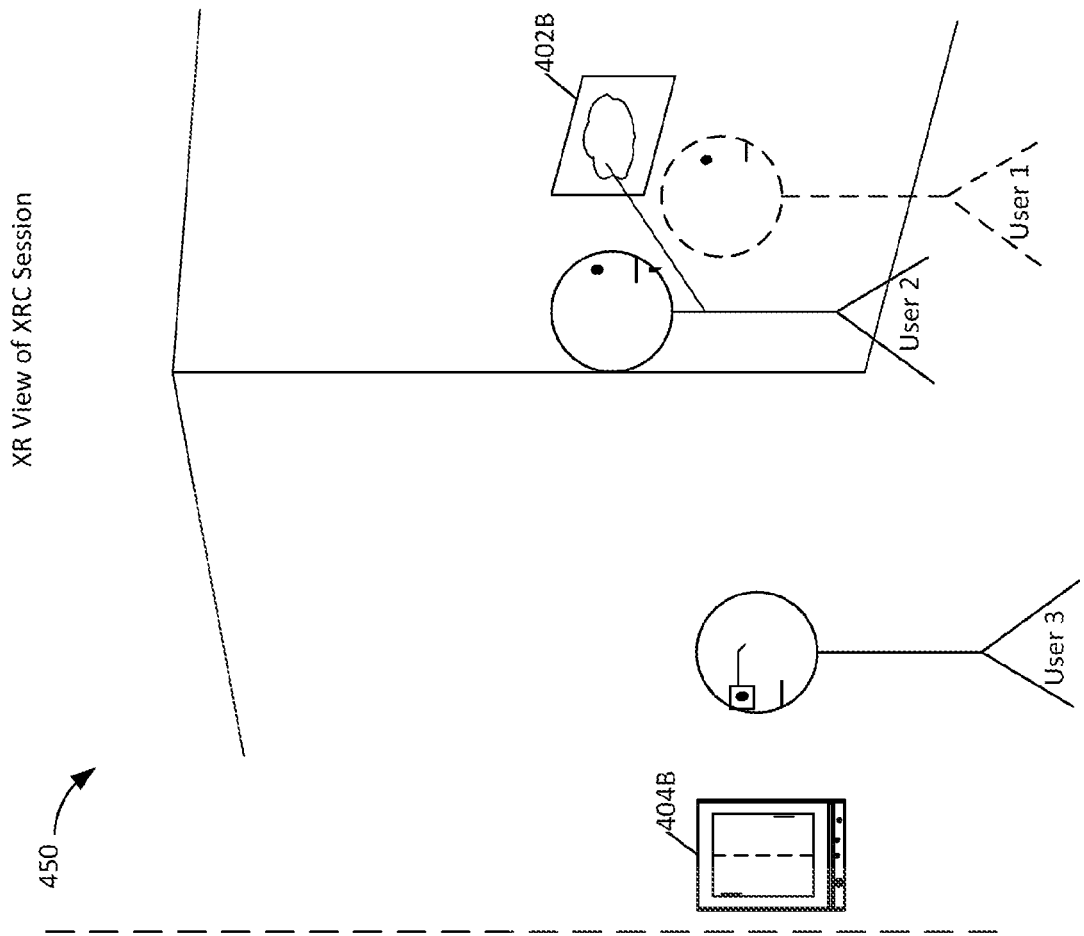
FIGS. 4A, 4B, 5A, 5B, 6A, and 6B illustrate views a XR communication (XRC) session, in accordance with aspects of the present disclosure.
Figure 4A:
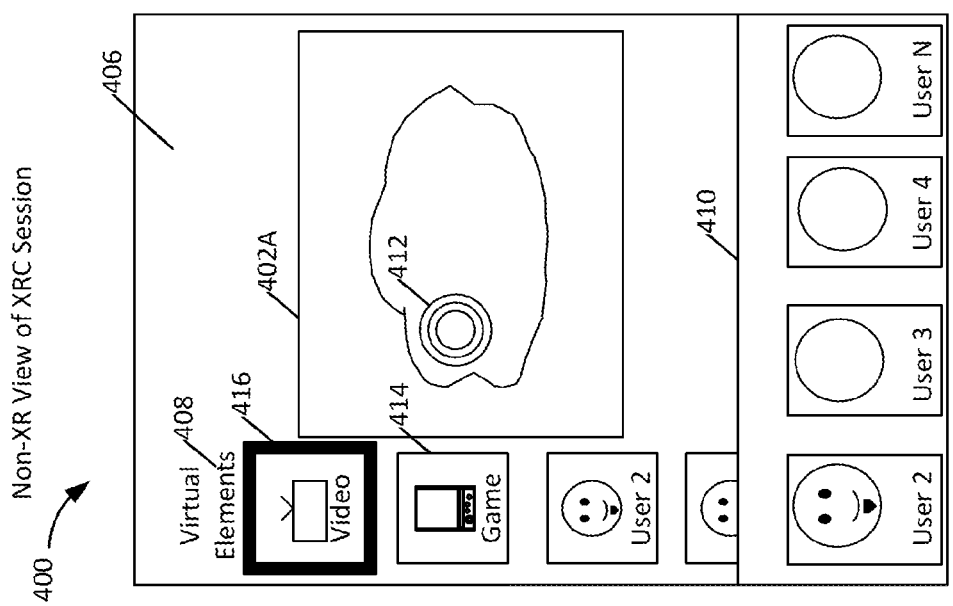

In accordance with aspects of the present disclosure, how the information describing the shared virtual elements of the XRC session are displayed for a given device may be adjusted based on properties and capabilities of the device. FIG. 4A illustrates a non XR first view 400 of a XRC session, and FIG. 4B illustrates an XR second view 450 of the same XRC session, in accordance with aspects of the present disclosure. Of note, for clarity the first view 400 is displayed by a first device associated with User 1 and is presented from the point of view (POV) of an avatar of User 1 in the XRC session. The second view 450 is a user-independent view into the XRC session.

Generally, in an XRC session, the focus of the XRC session is on the content (e.g., the shared virtual elements) of the XRC session. To enhance the ability of participants to interact with the content of the XRC session, the scene graph may encode the shared virtual elements and then describe the 3D relationship relative to the shared virtual elements. In certain cases, the same scene graph can be used to render the first view 400 and second view 450. For example, assuming the views were from the same POV, a first device that is not capable of displaying an XR view, may render the view as shown in the first view 400 based on the scene graph, while a device capable of displaying the XR view may render the view as shown in the second view 450 based on the scene graph. As another example, the same scene graph may include one or virtual objects, a description of virtual objects for displaying the virtual objects, and their respective locations. The first device may display all or a subset of the virtual objects in a list in a virtual elements UI 408, while the second device may display the virtual objects within the second view 450. Devices capable of participating in the XRC session may include a feature mapping layer to help the device determine how to present the elements described in the scene graph.

A feature mapping layer may be used to translate aspects of the scene graph for a device. The feature mapping layer may be specific to a device or type of devices and may define how the device presents the shared virtual elements of the XRC session. How the shared elements are presented on the device may be based on the capabilities of the device. For example, a head-mounted system may be capable of displaying a 3D representation of the XRC session and the feature mapping layer may account for this. The head mounted system may then be configured to render a view of the XRC session with shared virtual elements spatially arranged around a 3D setting of the XRC session. The user of the head-mounted system may then be able to spatially maneuver in the 3D setting among the different shared virtual elements, such as video element 402B, game element 454, User 1, User 2, and User 3. Of note, additional users, User 4 . . . User N may also be present in the 3D setting, but may not be visible in the second view 450. For example, those users may be behind the POV of the second view 450.

Certain devices, such as a desktop or laptop computer, tablet, phone, etc., may be capable of displaying a two-dimensional (2D), non-XR view (e.g., non-immersive) into the 3D setting of the XRC session, which flattens the spatiality (e.g., depth) of the XRC session. The corresponding feature mapping layer may indicate to such devices to internally render a 3D representation of the 3D setting and then display the 2D second view 450 by rasterizing, ray-tracing, or otherwise generating a 2D viewport 406 of the 3D setting. In this example, a location of the viewport 406 of User 1 corresponds to the location of the avatar of User 1 in the 3D setting of the XRC session. As User 1 is interacting with (e.g., viewing) the video element 402A in the viewport 406, the avatar of User 1 in the 3D setting of the XRC is shown looking at corresponding video element 402B.

In certain cases, representations of users may be displayed in the 3D setting of the XRC session as avatars. An avatar may or may not mimic physical characteristics of the user and may or may not mimic facial expressions of the user. In certain cases, the avatar may indicate a device state. For example, as shown in the second view 450, an avatar representing User 1 may include an indication that User 1 is accessing the XRC session using a non-XR view, here shown using a dashed outline. In certain cases, the indication may be by using a 2D avatar, an image, displaying an icon, using a different avatar, a floating orb replacing the avatar, directional audio, etc. As discussed further below, users using a non-XR view may navigate the 3D setting in a way that may seem unnatural when represented by a regular looking avatar and including an indication that a user is using a non-XR view may help alleviate such issues. In another example, an avatar may be depicted to be wearing headphones when the user is wearing headphones. In other cases, information gathered by a user device may be used to update the avatar. For example, if the user is wearing headphones capable of detecting if one or more of the headphones are removed (e.g., one or more earbuds removed), or a headset capable of detecting headset removal, the avatar of the user may display an indication that the user's attention has been directed elsewhere, such as by greying out the avatar, displaying a certain animation/icon, switching to a default/inactive state, etc.

In the XR second view, users may be able to point to, highlight or otherwise interact with shared virtual elements. In this example, User 2 is shown interacting with the video element 402B. In certain cases, interactions with a virtual element, such as a XRCE application, may be normalized to an image space relative to the virtual element. For example, where User 2 touches the video element 402B may be determined relative to the video element 402B and this relative location may be encoded in the scene graph. By encoding interactions relative to virtual element, interactions may be translated across devices despite possible differences in terms of resolution, aspect ratio, size, etc.

In certain cases, the non-XR view into the XRC session may be more space constrained than the XR view and it may be more difficult, when using the non-XR view, to see other users in the XRC session as well as other users who may be interacting with the same virtual element. For example, in the XR view, other users may be peripherally visible. To help address such issues, the non-XR view may include a UI element, such as users bar 410, indicating which other users are participating in the XRC session. While the users bar 410 is shown as a list of avatar faces in this example, it may be understood that any UI element, or combination of UI elements, may be used to convey the information described herein. In certain cases, the users bar 410 may indicate which other users are interacting with the same virtual element as the user associated with the non-XR view. As an example, as shown in the second view, User 1 and User 2 are both interacting with video element 402A/402B while Users 3, 4, . . . N, are not. In this example, the avatar faces of users which are interacting with the same virtual element, here User 2, may be shown in the users bar 410. Other users, Users 3, 4, . . . N, are shown turned away, indicating that those users are not interacting (e.g., disengaged) with the video element 402. For example, User 3 is interacting with game element 404B and Users 4, . . . N, may be interacting with other elements (not shown). In other embodiments, it may be desired to make the avatar faces of users in users bar 410 visible, rather than turning away. In such cases, another indication of which users are not interacting, or are interacting, with the same virtual element as the user associated with the non-XR view may be used, such as an icon, user ordering, highlighting/outlining certain users, greying out users, etc.

As indicated above, in certain cases, users may be able to point to, highlight, or otherwise interact with shared virtual elements. In the XR view of the XRC session, such as shown in the second view 450, a user, such as User 2, may be able to manipulate their avatar to reach out and touch the video element 402B. The location where User 2 touches the video element 402B may be determined based on a coordinate system relative to the virtual element and encoded into the scene graph. In certain cases, devices which render a non-XR view of the XRC session may be able to display and/or transmit touch/highlight information. For example, an interaction indication 412 may be displayed in the viewport 406 based on the location information encoded in the scene graph corresponding to where User 2 touched the video element 402B. In certain cases, how the interaction indication 412 is displayed may be based on the virtual element. For example, different XRCE applications may display interaction indication 412 in different ways, depending, for example, on how such interactions are handled by the XRCE application, a mode of the XRCE application, the content being displayed, etc.

As indicated above, the focus of the XRC session is usually on the shared virtual elements, and the feature mapping may include alternate ways to present certain shared virtual elements rather than arranged spatially around the 3D setting. In certain cases, the shared virtual elements that a user may interact with in the XRC session may be determined from the scene graph. These interactive shared virtual elements may be collected and displayed in a portion of the 2D second view 450. For example, a UI element, such as the virtual elements UI 408 may display a listing of the interactive shared virtual elements. While shown as a list, it may be understood that the interactive shared virtual elements may be displayed in any suitable UI, such as a wheel, grid, drop-down, menu, etc. By collecting and displaying the interactive shared virtual elements together, a user is more easily able to find the virtual elements in XRC session with which they may interact with. In certain cases, the XRC session may include non-interactive virtual elements, such as decorative items, orienting surfaces, backgrounds, etc., and such non-interactive virtual elements may be omitted from the virtual elements UI 408. Here, the virtual elements UI 408 includes video element 402A and game element 414. In some cases, the virtual elements may include XRCE applications that users may interact with. For example, game element 414 may represent a game XRCE application that users of the XRC session may play.

In certain cases, a user may interact with other users. In such cases, a representation of other users may be displayed in the virtual elements UI 408. This representation of other users in the virtual elements UI 408 may correspond to avatars of the other users, or may be another representation, such as a list of usernames, representative pictures, phone numbers, etc. In this example, as User 1 and User 2 are both interacting with video element 402B, User 1 and User 2 may be considered interacting with each other. This interaction may be indicated in the users bar 410, where the avatar face of User 2 is shown, while the other users, which are not interacting with User 1, are shown turned away. While shown in the context of a non-XR view of the XRC session, it should be understood that the virtual elements UI 408 and users bar 410 can be used in conjunction with other views, including an XR view of the XRC session.

Figures 5A, 5B:
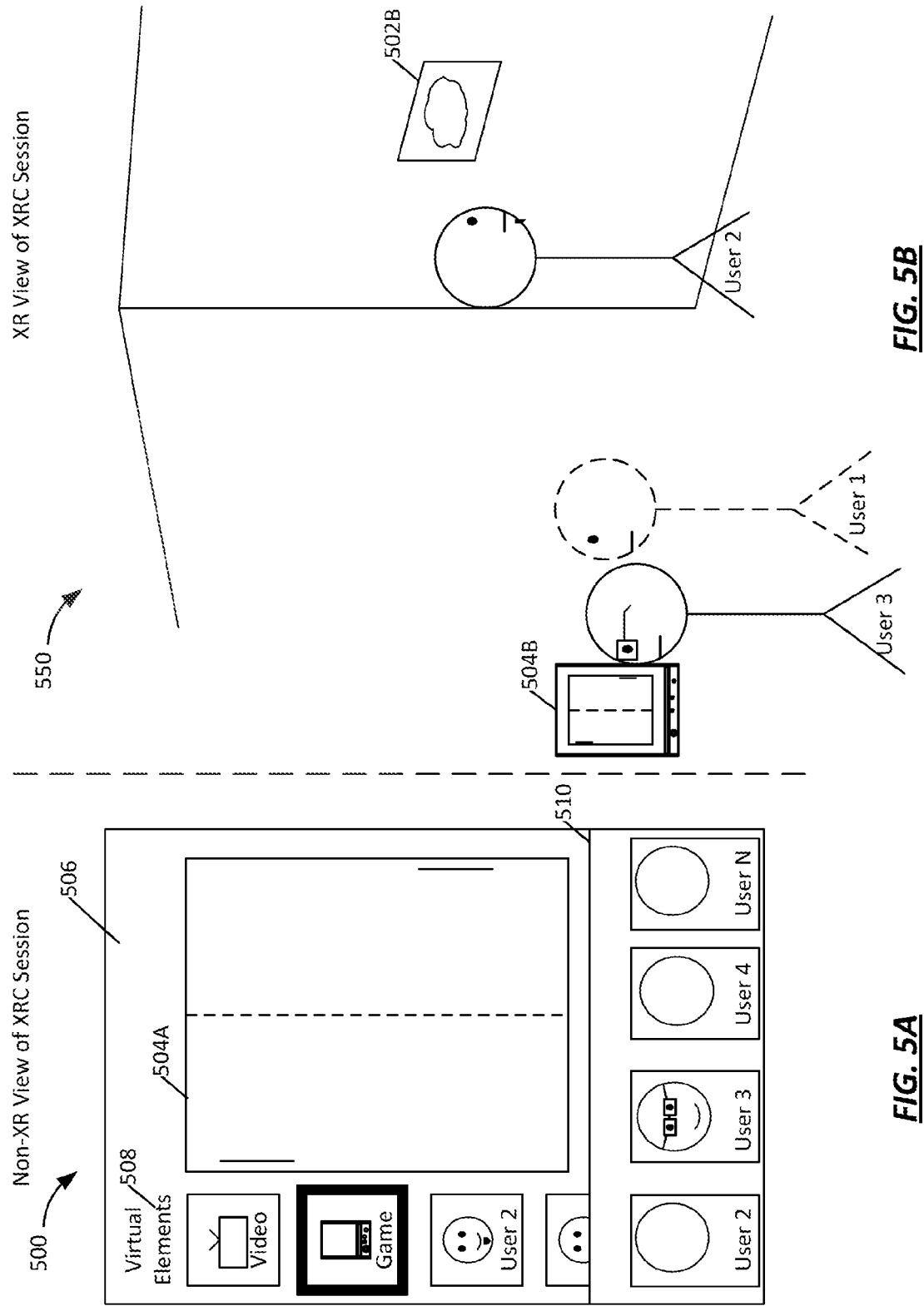

A user may interact with the virtual elements UI 408, for example, by selecting the video element 416 (shown highlighted) in the virtual elements UI 408. In certain cases, selecting an interactive virtual element in the virtual elements UI 408 may display the selected interactive virtual element, here the video element 402A, in the viewport 406 by moving the viewport 406 to face the corresponding interactive virtual element. In the 3D setting of the XRC session, the viewport 406 of the user, in this example User 1, may correspond to a representation of the user, such as an avatar of User 1. Moving the viewport 406 between interactive virtual elements may thus be visualized in the 3D setting of the XRC session by moving the representation of the user between the interactive virtual elements. For example, User 1 may select a game element 414 from the virtual elements UI 408. As shown in FIG. 5A, the viewport 506 shown in first view 500 may be moved to display a game element 504A, and the game element 514 from the virtual elements UI 508 may be highlighted based on the selection. In second view 550 shown in FIG. 5B, the avatar of User 1 may be moved from video element 502B to game element 504B. In certain cases, the avatar of User 1 may be automatically moved from video element 502B to game element 504B through the 3D setting as if User 1 were moving their avatar. In other cases, the avatar of User 1 may be moved in another fashion, such as being teleported, moving an icon, etc. The users bar 510 may also be updated to indicate which other users are interacting with the same virtual element as the user. In this example, an avatar face represent User 3 is now shown, while avatar faces of User 2, 4, . . . N are now shown turned away.

Figure 6B:
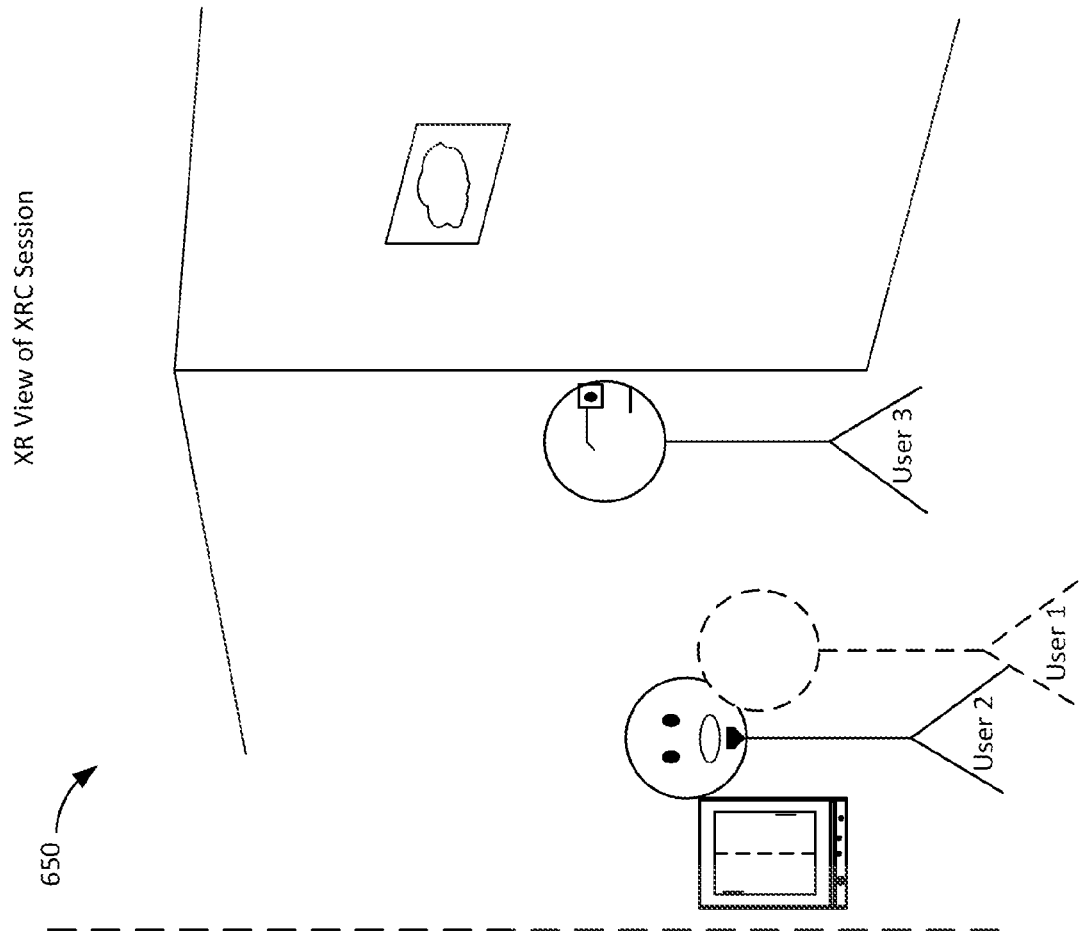

In certain cases, a user may interact with another user using the virtual elements UI. For example, in reference to FIG. 6, User 1 may select User 2 from the virtual elements UI 608. In response, the viewport 606 shown in first view 600 may be moved to face User 2 and a user element 616 corresponding to User 2 in the virtual elements UI 608 may be highlighted based on the selection. In certain cases, User 2 may be given an option to approve of the interaction prior to moving the viewport 606. In second view 650, the avatar of User 1 may be moved to face an avatar of User 2.

In accordance with aspects of the present disclosure, the avatars of either or both of the users may be animated based on motion data. Motion data may be provided from a variety of sensors, including sensors which may be worn, held, or separate from the user. As an example, an avatar's face may be animated based on the expressions of the user represented by the avatar based on captured images of the user's face. The captured images may be provided by a variety of sensors, such as a visible light camera, dot projector, non-visible light sensor, ultrasonic, radar, etc. The sensors may be, for example, built into a participating device, such as the electronic device discussed above in conjunction with FIG. 2. Movement of the avatar's head may also be based on these captured images, or another sensor, such as accelerometers in a head mounted display or headphones. Motion data may also be captured, for example, by a hand-held controller, imaging device, or touch surface, and this motion used to animate a body, limbs, or another portion of the avatar.

Different motion data may be captured for each user. For example, a first user may be participating in the XRC session via a tablet device which includes a camera and/or dot projector. Images captured by the camera and/or dot projector may be analyzed to generate motion data, such as for a face, of the user by the tablet device. Participating devices may be configured to gather information from a variety of sensors and generate, from this information, motion data in a common format. That is, participating devices process sensor information to generate a common motion data. In certain cases, the first user's body/limbs may be hidden from the camera and/or dot projector, and motion data corresponding to those portions of the avatar may be not available. The motion data available may be transmitted to other participants in the XRC session, for example in the scene graph. Another participating device may receive the motion data and user the motion data to animate an avatar corresponding to the first user. Where motion data for an avatar is unavailable, the corresponding portion of the avatar may remain in a default or non-animated position (e.g., arms by the side, not moving relative to the rest of the avatar).

In certain cases, an interaction may be initiated by a user accessing the XRC session via an XR view. For example, User 2 may attempt to interact with User 1 by turning their avatar to face User 1, pressing a button, attempting to touch the avatar of User 1, etc. When User 2 initiates an interaction with User 1, the viewport 606 of User 1 may be moved to face User 2 and the user element 616 corresponding to User 2 in the virtual elements UI 608 may be highlighted. In certain cases, User 1 may be presented an option to approve the interaction initiation from User 2.

In certain cases, a particular arrangement of the shared content items or a view from a particular POV may be important to convey from one user to another. In such cases, a user may be able to move the viewport 606 or avatar of the other user to a particular position temporarily. In certain cases, rather than moving viewport 606 or the avatar of other users, a third person view, such as an over the shoulders view may be used to indicate to other users that another user may be controlling the view temporarily.

Figure 6A:
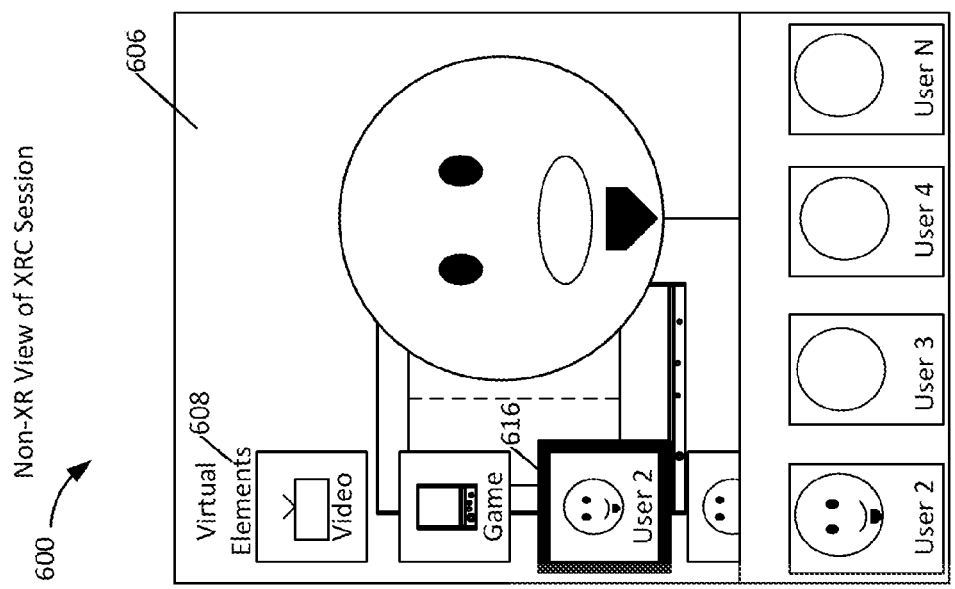
Figure 7:
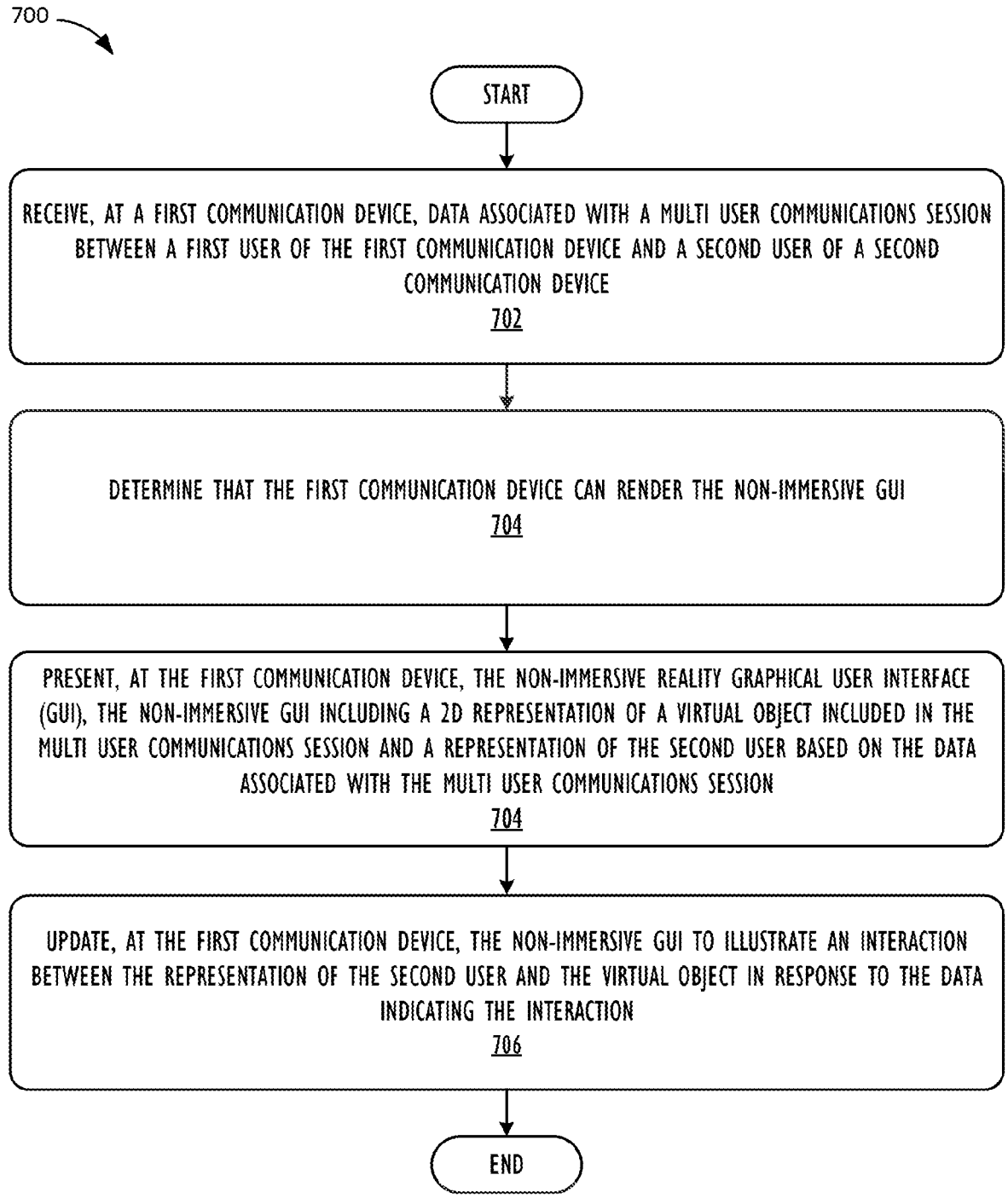
FIGS. 7 and 8 are block diagrams illustrating techniques for interacting in a XRC session, in accordance with aspects of the present disclosure.

FIG. 7 illustrates a first technique 700 for interacting in a multi user communications session, in accordance with aspects of the present disclosure. At block 702, the first communications device receives data associated with a multi user communication session between a first user of the first communication device and a second user of a second communication device, wherein the first data associated with the multi user communication session is configured to be presented as an XR graphical user interface (GUI) or a non-immersive GUI, such as two dimensional (2D) GUI. For example, a non-XR device, such as a laptop, desktop, tablet, smartphone, etc. that displays a 2D image, may be participating in an XRC session and receive data from the XRC session. In some cases, the non-immersive GUI may differ from the XR GUI in that the non-immersive GUI includes traditional 2D elements (e.g., flat elements), or 2.5D elements in which elements may have shading, relative sizing, foreshortening, etc., to simulate a three dimensional effect on a traditional flat (e.g., 2D) display. The 2.5D elements help present a perspective view on the traditional flat display and can be considered a type of 2D image for display on a traditional flat display. In certain cases, the data may include a scene graph describing the virtual environment and elements of the XRC session. At block 704, the first communication device determines that the first communication device can render the non-immersive GUI. For example, the non-XR device may determine that the non-XR device supports the non-XR view of the XRC session, or that the non-XR device does not support the XR view of the XRC session. At block 706, the first communication device presents a non-XR graphical user interface (GUI), the non-XR GUI including a non-XR representation of a virtual object included in the multi user communication session and a representation of the second user based on the data associated with the multi user communication session. For example, the non-XR device may render a non-XR view of the XRC session. The non-XR view may include a virtual elements UI which indicates virtual elements, such as XRCE applications, other users, and other interactive virtual elements, that the user may interact with. The virtual elements UI, as discussed in conjunction elements 408, 508, and 608 of FIGS. 4A, 5A, and 6A, respectively, may be displayed in any suitable UI, such as a wheel, grid, drop-down, menu, etc. At block 708, the first communication device updates the non-XR GUI to illustrate an interaction between the representation of the second user and the virtual object in response to the data indicating the interaction. For example, the first user, such as a user associated with viewport 506 of FIG. 5, may select a virtual element to interact with from the virtual elements UI. A viewport of the user may be updated based on the selection, for example, to display the selected virtual element.

In certain cases, the first technique 700 may also include receiving, at the second communication device, second data associated with the multi user communication session. For example, an XR device, such as a head mounted system, may be participating in an XRC session and receive data from the XRC session. In certain cases, the data may include a scene graph describing the virtual environment and elements of the XRC session. The second communication device may present an XR GUI including an XR representation of the virtual object and an avatar of the first user in an environment of the second user based on the second data, as described in conjunction with elements 450, 550, and 650 of FIGS. 4B, 5B, and 6B, respectively. The second communication device may update the XR GUI to illustrate a second interaction between the avatar and the virtual object in response to the second data indicating the second interaction. For example, the XR GUI may present a view of the environment showing the first user interacting with the virtual object based on data from the first user.

In certain cases, image data may be captured at the first communication device. For example, one or more cameras of the first device may capture image data. The first communication device may generate motion data descriptive of motion of the first user based on the image data. For example, images captured by the camera may be analyzed to generate motion data. The first communication device may transmit the motion data to the second communication device. The second communication device may receive the motion data and animate the avatar of the first user based on the motion data. In certain cases, the virtual object includes an application. In certain cases, the virtual object includes a depiction of a third user of the multi user communication session.

In certain cases, the first communication device may update the non-XR GUI to illustrate the representation of the second user disengaged from the virtual object in response to an indication that the second user is interacting with a different virtual object. For example, as shown in FIGS. 5A-6B, if a second user stops interacting with an object that the first user is interacting with, a user bar of the non-XR view may be updated to indicate that the second user is no longer interacting with the object.

In certain cases, wherein the first data and second data include a scene graph describing virtual object and users in the multi user communication session. For example, the scene graph may encode the content of the XRC session, including users and shared virtual elements. In certain cases, the scene graph is configured to be presented in either the XR GUI or the non-immersive GUI. For example, the same scene graph can be used to render the first view 400 and second view 450 of FIG. 4.

In certain cases, the non-immersive GUI is presented based on the scene graph and includes a viewport presenting a view into the multi user communication session, a listing of virtual objects in the multi user communication session, and an indication of other users in the multi user communication session, as described in conjunction with the first view 400, 500, and 600 of FIGS. 4A, 5A, and 6A, respectively. In certain cases, the XR GUI is presented based on the scene graph and includes a three-dimensional view into the multi user communications session, wherein the virtual objects and other users are presented within the environment of the second user, as described in conjunction with the second view 450, 550, and 650 of FIGS. 4B, 5B, and 6B, respectively.

In certain cases, the first communication device may receive a selection of a second virtual object from the listing of virtual objects. For example, as described above with respect to video element 416 of FIG. 4, a virtual object may be selected in the virtual elements UI. In certain cases, first avatar movement data descriptive of moving the first user to the second virtual object may be generated. For example, based on the selection of the virtual object, the first communications device may describe, for example in the scene graph, the movement of the viewport and avatar of the first user to the selected virtual object. In certain cases, the first motion data is transmitted to the second communication device. In certain cases, the second communication device may receive the first avatar movement data and moving the avatar of the first user based on the first avatar movement data. For example, the second communication device may update the view to show the avatar of the first user moving to the selected virtual object, as shown in FIGS. 4B and 5B. In certain cases, the avatar movement may be represented as if the user were moving the avatar, teleported, or other representation of movement.

In certain cases, the second communication device may receive an indication to move to the virtual object the first user is interacting with. For example, a second user of the XR device may move their avatar to a virtual object that the first user of the non-XR device is interacting with. The second communication device may generate second avatar movement data descriptive of moving the second user to the virtual object and transmit the second motion data to the first communication device. In certain cases, the first communication device may receive the second avatar movement data and update the indication of other users to indicate that the second user is interacting with first user. For example, as shown in FIG. 4A, the users bar 410 may be updated to indicate that another user is interacting with the first user when they are interacting with the same virtual object.

Figure 8:
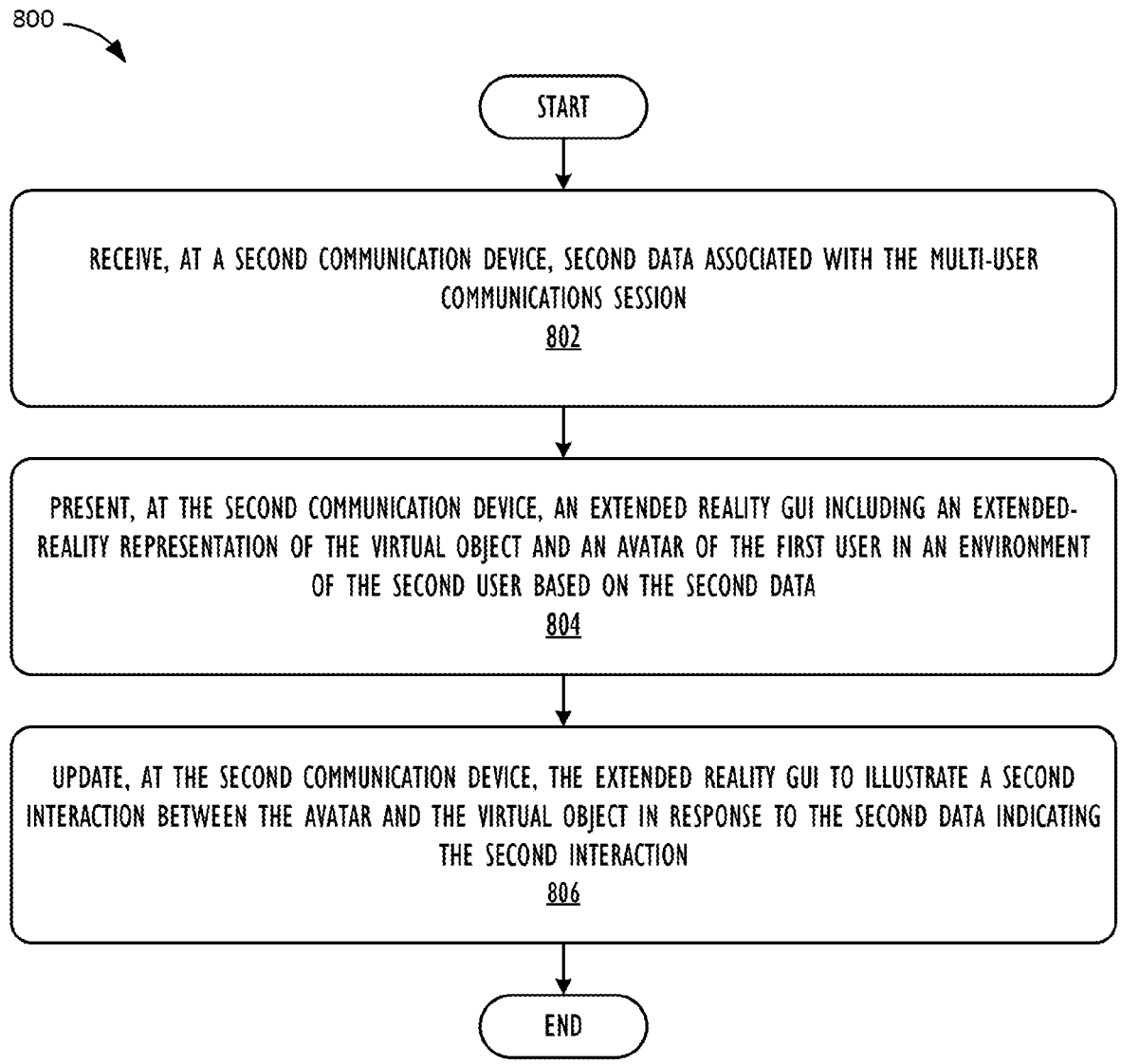

FIG. 8 illustrates a second technique 800 for interacting in a multi user communications session, in accordance with aspects of the present disclosure. In certain cases, this second technique 800 may extend the first technique 700. At block 802, a second communications device receives second data associated with the multi user communication session. For example, the first communications device may transmit XRC data associated with the XRC session to the other participants of the XRC session. The first communications device may be a non-XR device in certain cases. This data may be received by the other participants. At block 804, the second communication device presents an XR GUI including an extended reality representation of the virtual object and an avatar of the first user in an environment of the second user based on the second data. For example, the XRC data may include the scene graph and the other participating devices may render an XR view of the XRC session based at least in part on the XRC data from the first user. At block 806, the second communication device updates the extended reality GUI to illustrate a second interaction between the avatar and the virtual object in response to the second data indicating the second interaction. For example, the first user may select a virtual element to interact with and the XRC data from the first user may include information describing this selection.

Figure 9A:
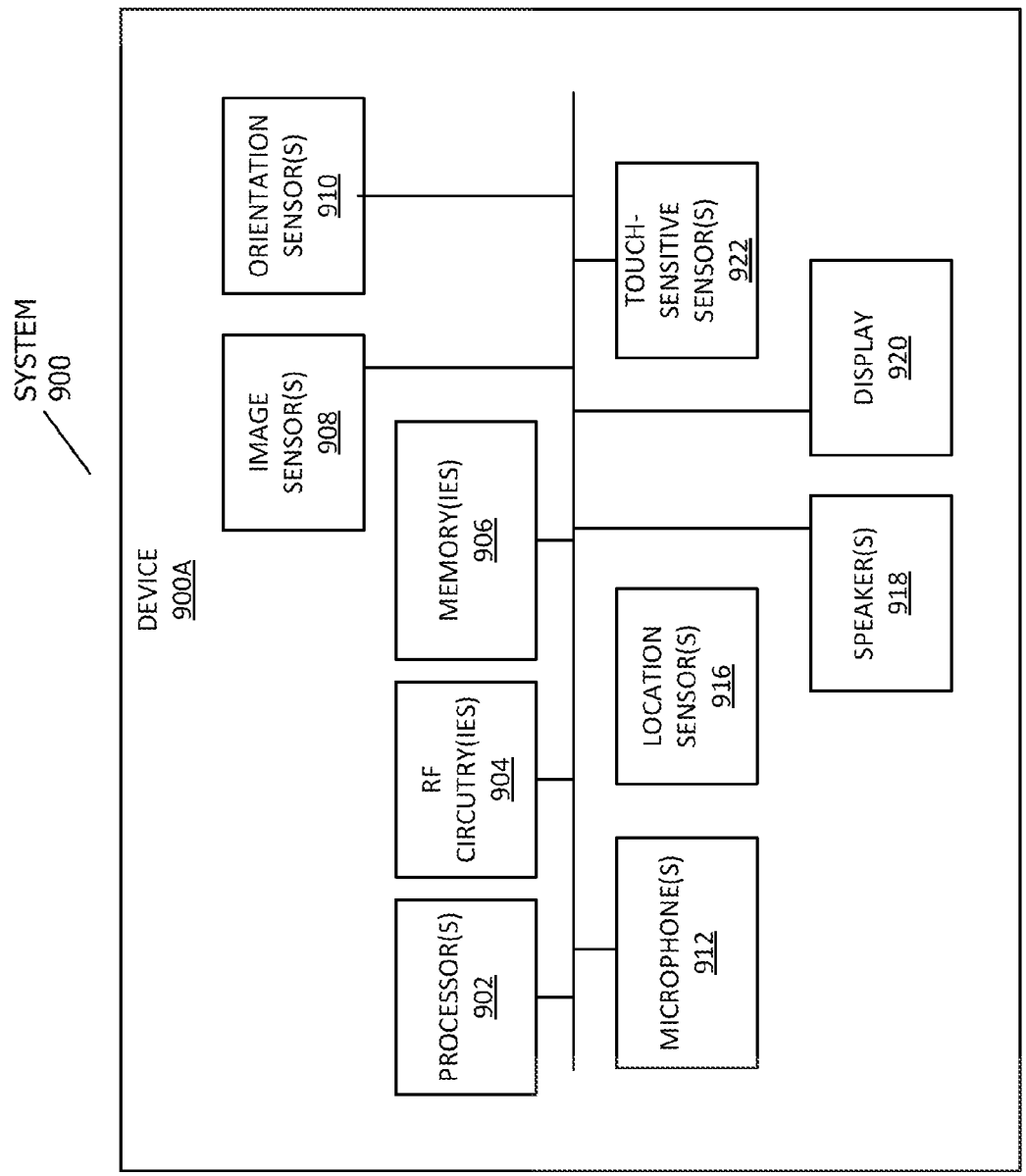

FIG. 9A and FIG. 9B depict exemplary system 900 for use in various XR technologies. In some examples, as illustrated in FIG. 9A, system 900 includes device 900a. Device 900a includes various components, such as processor(s) 902, RF circuitry(ies) 904, memory(ies) 906, image sensor(s) 908, orientation sensor(s) 910, microphone(s) 912, location sensor(s) 916, speaker(s) 918, display(s) 920, and touch-sensitive surface(s) 922. These components optionally communicate over communication bus(es) 950 of device 900a.

In some examples, elements of system 900 are implemented in a base station device (e.g., a computing device, such as a remote server, mobile device, or laptop) and other elements of system 900 are implemented in a second device (e.g., a head-mounted device). In some examples, device 900a is implemented in a base station device or a second device.

As illustrated in FIG. 9B, in some examples, system 900 includes two (or more) devices in communication, such as through a wired connection or a wireless connection. First device 900B (e.g., a base station device) includes processor(s) 902, RF circuitry(ies) 904, and memory(ies) 906. These components optionally communicate over communication bus(es) 950 of device 900b. Second device 900c (e.g., a head-mounted device) includes various components, such as processor(s) 902, RF circuitry(ies) 904, memory(ies) 906, image sensor(s) 908, orientation sensor(s) 910, microphone(s) 912, location sensor(s) 916, speaker(s) 918, display(s) 920, and touch-sensitive surface(s) 922. These components optionally communicate over communication bus(es) 950 of device 900c.

System 900 includes processor(s) 902 and memory(ies) 906. Processor(s) 902 include one or more general processors, one or more graphics processors, and/or one or more digital signal processors. In some examples, memory(ies) 906 are one or more non-transitory computer-readable storage mediums (e.g., flash memory, random access memory) that store computer-readable instructions configured to be executed by processor(s) 902 to perform the techniques described below.

System 900 includes RF circuitry(ies) 904. RF circuitry(ies) 904 optionally include circuitry for communicating with electronic devices, networks, such as the Internet, intranets, and/or a wireless network, such as cellular networks and wireless local area networks (LANs). RF circuitry(ies) 904 optionally includes circuitry for communicating using near-field communication and/or short-range communication, such as Bluetooth®.

System 900 includes display(s) 920. Display(s) 920 may have an opaque display. Display(s) 920 may have a transparent or semi-transparent display that may incorporate a substrate through which light representative of images is directed to an individual's eyes. Display(s) 920 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 920 include heads up displays, automotive windshields with the ability to display graphics, windows with the ability to display graphics, lenses with the ability to display graphics, tablets, smartphones, and desktop or laptop computers. Alternatively, system 900 may be designed to receive an external display (e.g., a smartphone). In some examples, system 900 is a projection-based system that uses retinal projection to project images onto an individual's retina or projects virtual objects into a physical setting (e.g., onto a physical surface or as a holograph).

In some examples, system 900 includes touch-sensitive surface(s) 922 for receiving user inputs, such as tap inputs and swipe inputs. In some examples, display(s) 920 and touch-sensitive surface(s) 922 form touch-sensitive display(s).

System 900 includes image sensor(s) 908. Image sensors(s) 908 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 908 also optionally include one or more event camera(s) configured to capture movement of physical elements in the physical setting. Image sensor(s) 908 also optionally include one or more depth sensor(s) configured to detect the distance of physical elements from system 900. In some examples, system 900 uses CCD sensors, event cameras, and depth sensors in combination to detect the physical setting around system 900. In some examples, image sensor(s) 908 include a first image sensor and a second image sensor. The first image sensor and the second image sensor are optionally configured to capture images of physical elements in the physical setting from two distinct perspectives. In some examples, system 900 uses image sensor(s) 908 to receive user inputs, such as hand gestures. In some examples, system 900 uses image sensor(s) 908 to detect the position and orientation of system 900 and/or display(s) 920 in the physical setting. For example, system 900 uses image sensor(s) 908 to track the position and orientation of display(s) 920, relative to one or more fixed elements in the physical setting.

In some examples, system 900 includes microphones(s) 912. System 900 uses microphone(s) 912 to detect sound from the user and/or the physical setting of the user. In some examples, microphone(s) 912 includes an array of microphones (including a plurality of microphones) that optionally operate in tandem, such as to identify ambient noise or to locate the source of sound in space of the physical setting.

System 900 includes orientation sensor(s) 910 for detecting orientation and/or movement of system 900 and/or display(s) 920. For example, system 900 uses orientation sensor(s) 910 to track changes in the position and/or orientation of system 900 and/or display(s) 920, such as with respect to physical elements in the physical setting. Orientation sensor(s) 910 optionally include one or more gyroscopes and/or one or more accelerometers.

The techniques defined herein consider the option of obtaining and utilizing a user's personal information. For example, one aspect of the present technology is automatically determining whether a particular device can display an XR view of an XRC session. However, to the extent such personal information is collected, such information should be obtained with the user's informed consent, such that the user has knowledge of and control over the use of their personal information.

Parties having access to personal information will utilize the information only for legitimate and reasonable purposes, and will adhere to privacy policies and practices that are at least in accordance with appropriate laws and regulations. In addition, such policies are to be well-established, user-accessible, and recognized as meeting or exceeding governmental/industry standards. Moreover, the personal information will not be distributed, sold, or otherwise shared outside of any reasonable and legitimate purposes.

Users may, however, limit the degree to which such parties may obtain personal information. The processes and devices described herein may allow settings or other preferences to be altered such that users control access of their personal information. Furthermore, while some features defined herein are described in the context of using personal information, various aspects of these features can be implemented without the need to use such information. As an example, a user's personal information may be obscured or otherwise generalized such that the information does not identify the specific user from which the information was obtained.

It is to be understood that the above description is intended to be illustrative, and not restrictive. The material has been presented to enable any person skilled in the art to make and use the disclosed subject matter as claimed, and is provided in the context of particular embodiments, variations of which will be readily apparent to those skilled in the art (e.g., some of the disclosed embodiments may be used in combination with each other). Accordingly, the specific arrangement of steps or actions shown in FIGS. 7 and 8 or the arrangement of elements shown in FIGS. 1-6 and 9A-9B, should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
    receiving, at a first communication device, first data associated with a multi user communication session between a first user of the first communication device and a second user of a second communication device, wherein the first communication device supports a non-immersive graphical user interface (GUI) and wherein the second communication device supports an extended reality GUI;
    presenting, at the first communication device, the non-immersive GUI comprising a listing of a graphical representation of at least some of a plurality of components present within the multi user communication session based on the first data associated with the multi user communication session, the plurality of components comprising a virtual object a representation of the second user;
    receiving a selection of the virtual object in the non-immersive GUI; and
    updating, at the first communication device, the non-immersive GUI to present a view of a portion of the multi user communication session comprising the selected virtual object in response to the selection.

2. The method of claim 1, further comprising:
    transmitting, to the second communication device, a second indication of the selection of the virtual object in the non-immersive GUI,
    wherein the second communication device updates the extended reality GUI to illustrate a second interaction between the representation of the first user and the virtual object.

3. The method of claim 2, further comprising:
    capturing image data at the first communication device;
    generating, at the first communication device, motion data descriptive of motion of the first user based on the image data; and
    transmitting, from the first communication device, the motion data to the second communication device.

4. The method of claim 3, wherein the second communication device animates the representation of the first user based on the motion data.

5. The method of claim 1, wherein the virtual object includes an application.

6. The method of claim 1, wherein the virtual object includes a depiction of a third user of the multi user communication session.

7. The method of claim 1, further comprising:
    receiving, at the first communication device, a second indication of an interaction between the second user and a second virtual object within the multi user communication session; and updating, at the first communication device, the non-immersive GUI to illustrate the representation of the second user interacting with the second virtual object.

8. The method of claim 7, wherein the second indication of the second user interacting with the virtual object comprises a scene graph describing a spatial relationship among virtual objects and users in the multi user communication session.

9. The method of claim 8, wherein the scene graph is configured to be used to render the components by either the extended reality GUI or the non-immersive GUI.

10. The method of claim 8, wherein the non-immersive GUI is presented based on the scene graph and comprises the plurality of components.

11. The method of claim 10, further comprising:
receiving at the first communication device, a selection of a third virtual object from the listing of the plurality of components;
generating, at the first communication device, first representation movement data descriptive of moving the representation of the first user to the third virtual object; and
transmitting, from the first communication device, the first representation movement data to the second communication device.

12. The method of claim 11, wherein:
a representation of the first user is moved at the second communication device based on the first representation movement data.

13. The method of claim 11, wherein
in response to the second user approaching the second virtual object, receiving second representation movement data descriptive of a movement of the second user to the virtual object.

14. The method of claim 13, further comprising:
updating of other users to indicate that the second user is interacting with first user.

15. The method of claim 8, wherein the extended reality GUI is presented based on the scene graph and includes a three-dimensional view into the multi user communications session, wherein the virtual objects and representations of other users are presented within an environment of the second user.

16. The method of claim 1, wherein the first communication device comprises a device which displays a 2-D image, and wherein the second communication device comprises a head mounted display.

17. A non-transitory computer readable storage device storing instructions executable by one or more processors to:
receive, at a first communication device, first data associated with a multi user communication session between a first user of the first communication device and a second user of a second communication device, wherein the first communication device supports a non-immersive graphical user interface (GUI) and wherein the second communication device supports an extended reality GUI;
present, at the first communication device, the non-immersive GUI comprising a listing of a graphical representation of at least some of a plurality of components present within the multi user communication session based on the first data associated with the multi user communication session, the plurality of components comprising a virtual object a representation of the second user;
receive a selection of the virtual object in the non-immersive GUI; and
update, at the first communication device, the non-immersive GUI to present a view of a portion of the multi user communication session comprising the selected virtual object in response to the selection.

18. The non-transitory computer readable storage device of claim 17, wherein the instructions executable by one or more processors are further configured to cause the one or more processors to:
capture image data at the first communication device;
generate, at the first communication device, motion data descriptive of motion of the first user based on the image data; and
transmit, from the first communication device, the motion data to the second communication device.

19. The non-transitory computer readable storage device claim 17, wherein the instructions are further executable by the one or more processors to:
receive at the first communication device, a selection of a second virtual object from the listing of the plurality of components;
generate, at the first communication device, first representation movement data descriptive of moving the representation of the first user to the second virtual object; and
transmit, from the first communication device, the first representation movement data to the second communication device.

20. A system comprising:
a first communication device including:
one or more processors; and
a memory storing instructions executable by the one or more processors to:
receive first data associated with a multi user communication session between a first user of the first communication device and a second user of a second communication device, wherein the first communication device supports a non-immersive graphical user interface (GUI) and wherein the second communication device supports an extended reality GUI;
present the non-immersive GUI comprising a listing of a graphical representation of at least some of a plurality of components present within the multi user communication session based on the first data associated with the multi user communication session, the plurality of components comprising a virtual object a representation of the second user;
receiving a selection of the virtual object in the non-immersive GUI; and
updating, at the first communication device, the non-immersive GUI to present a view of a portion of the multi user communication session comprising the selected virtual object in response to the selection.

* * * * *